United States Patent Office 2,775,527
Patented Dec. 25, 1956

2,775,527

REFRACTORY MATERIAL

Leslie W. Austin, San Jose, and James C. Hicks, Menlo Park, Calif., assignors to Kaiser Aluminum & Chemical Corporation, Oakland, Calif., a corporation of Delaware No Drawing. Application December 18, 1951,
Serial No. 262,334

14 Claims. (Cl. 106—60)

This invention relates to an improved refractory material and to a process for making it, and more particularly it relates to a refractory material comprising agglomerated crystals of periclase, spinel, and magnesioferrite, and to methods of producing such material suitable for use as a grain or aggregate in the preparation of refractory shaped articles, particularly those to be applied in high temperature operations.

It has been common practice to employ silica, lime, iron oxide, and alumina as fluxes to promote the sintering and crystallization of magnesia. It has been proposed to employ specific ratios of these oxides, one to another or to others in magnesia compositions. For example, it is suggested to employ sufficient lime to form dicalcium silicate with the silica and calcium ferrite with the iron and calcium aluminate with the alumina present in the composition. Or to adjust the ratios to provide dicalcium silicate with sufficient calcium magnesium silicate (monticellite) to insure that no free lime exists. It has been known to use calcium ferrite as the principal fluxing agent or sintering aid in the formation of periclase, crystalline magnesium oxide.

Lime is known to be a very efficient mineralizer in magnesia systems, in combination with silica or with either iron or aluminum oxides. However, lime has been found to be an objectionable impurity in a magnesia-bearing refractory, for the following reasons: When lime is present together with silica it forms monticellite, which with its associated eutectics produces liquids at temperatures below 1500° C. and thus limits the utility of the refractory material. With alumina or iron oxide or both lime forms eutectics which melt below about 1300° C. All of these eutectics can exist in a high magnesia system, and they therefore constitute a limitation on the properties of a magnesia refractory containing them.

Iron oxide and alumina have been known to form eutectic compositions which melt as low as 1300° C., and as noted above they have occurred or have been added individually in small amounts along with preferred ratios of lime and silica in magnesia compositions as fluxes to aid in sintering the magnesia. Because of this known fluxing action in the known compositions and the production of low-melting eutectics when iron and aluminum oxides are heated together, it has been considered necessary to limit the amounts of these oxides in magnesia refractory compositions to a few percent at most. These limits have normally been considered to be not over about five percent of iron and aluminum oxides together in the best compositions. In fact, in raw materials such as magnesites containing as much as 10% of these "impurities" on the ignited basis it has been though essential to sort or otherwise concentrate the material to reduce the content of iron plus aluminum oxides to substantially below ten percent when the material was to be used for any refractory purposes.

Contrary to the above indications it has now been found that large amounts of iron and aluminum oxides can be employed in combination with magnesia to produce a refractory material possessing excellent properties and suitable for many highly refractory applications, provided that the lime (CaO) content of the fired refractory material is less than about two percent by weight. According to the present invention there is produced a nonfused refractory material comprising agglomerated intergrown crystals, in substantially uniform dispersion, of periclase, (MgO), magnesium aluminate (MgO·Al$_2$O$_3$), and magnesioferrite (MgO·Fe$_2$O$_3$), and containing less than 2.0% lime (CaO). The refractory material contains from 10% to 90% of periclase crystals, from 5% to 85% of magnesium aluminate crystals, and from 5% to 85% of magnesioferrite crystals. The magnesioferrite and magnesium aluminate are spinels, and in these spinels, without departing from the scope of the invention, a minor amount, of each, of the magnesium, iron, and aluminum oxides can be replaced by other spinel-forming metal oxides. For example, the MgO can be replaced by a spinel-forming oxide of divalent metal such as cobalt, iron, manganese, nickel, zinc, or mixtures thereof, and the Fe$_2$O$_3$ or Al$_2$O$_3$ can be replaced by a spinel-forming oxide of a metal in trivalent or tetravalent state, such as chromium, cobalt, gallium, or indium, manganese, tin, titanium, vanadium, or mixtures thereof.

The magnesia starting material is a magnesium compound which forms periclase upon firing, for example, magnesium hydroxide, natural or artificial magnesite, magnesium carbonate, bicarbonate or basic carbonate, magnesium alcoholate, magnesium chloride or sulfate or other water-soluble magnesium salt, incompletely crystallized magnesium oxide, hard-burned magnesia, periclase, etc. The magnesium hydroxide can be prepared, for example, by reacting a magnesium salt solution or brine with an alkali such as caustic soda, lime, calcined dolomite or the like, the latter two reagents either in dry or hydrated or slurry form, to precipitate Mg(OH)$_2$, and then washing and preferably separately recovering the latter. The magnesium compound starting material is of such purity that the final product prepared according to the invention contains not over 2.0% CaO, and the silica content is also low, preferably not over 5%.

The starting materials for the spinel component of the refractory material can be spinels or metal oxides adapted to form the spinels with magnesia. For example, as the iron oxide-yielding material, or a material yielding iron oxide upon firing, there can be employed iron oxide, mill scale, pyrite sinter, magnetite, hematite, laterite, siderite or limonite. As materials providing the alumina component of the spinels there can be employed alumina, hydrated alumina or a natural or artificial aluminum hydroxide or alumina hydrate such as bauxite, diaspore, gibbsite, hydrargillite, laterite or precipitated aluminum hydroxide. Salts of aluminum or iron which are soluble in water or in another liquid used in mixing can be employed. Any desired mixtures of starting materials can be employed.

In addition to the above-named examples of starting materials there are, of course, ores or concentrates thereof which are suitable sources of both the iron and aluminum oxides. For example, certain bauxites and laterites contain appreciable amounts of both iron and aluminum oxides and are also low in silica content and practically free from lime. At least a part of the iron and aluminum oxides can be provided in the form of concentrates of black beach sands which contain magnetite, and manganiferous iron ores such as certain magnetite deposits; and a minor portion of the iron oxide and alumina can be provided by the addition of chromite ore, being supplemented by other sources of these components. The ores may also supply small amounts of the other spinel-forming metal oxides mentioned above.

As stated above, the amount of lime, CaO, present in the starting materials or mixture to be fired is limited so that the final fired product will contain not over 2% CaO. Silica is desirably kept as low as possible, preferably not over 5%, and where highest load strengths are desired over the whole range of firing temperatures, silica is limited to not over 2% in the fired product. The presence of other fluxing agents should be avoided. Boron, calculated as $B_2O_3$, preferably does not exceed 1.0% in the fired product; and alkali, calculated as the oxide, e. g. sodium oxide or potassium oxide, preferably does not exceed 1.0% in the fired product.

The starting materials are admixed in very finely divided form, or as intimate interdispersions. This can be accomplished in any desired manner. For example, solutions of the starting materials in a mixing liquid, for instance water, can be mixed together and then dried, or the desired components can be precipitated from the mixed solution. In another mode of procedure, some of the starting materials can be mixed together and then admixed or nodulized with addition of a solution of other starting materials or other forms or compounds of the dry starting materials. The starting materials, where in solid form, should be reduced to finely divided state, preferably to a particle size substantially entirely less than 149 microns in diameter. The starting materials, if desired, can be ground separately and then mixed; or they can be ground together. Improved results are obtained as the materials are more finely divided and preferably the materials are predominantly less than 44 microns in diameter, and with a substantial portion, at least 10%, less than 10 microns in diameter. Excellent results are obtained by starting with precipitated materials such as precipitated magnesium hydroxide or carbonate or basic carbonate. Two or more of the starting materials can be co-precipitated, for example, magnesium hydroxide and iron hydroxide or aluminum hydroxide or all three.

In another mode of procedure, the iron oxide and alumina components are admixed and at least partially reacted, preferably with heating, to form iron aluminate and then combined with the magnesia, according to the invention. This can be effected by mixing the finely divided materials which provide iron oxide and alumina, as described above, and firing to form a frit. In another method, the materials are melted together to cause reaction. The fritted or melted products are crushed or comminuted and are admixed with the periclase-yielding component and the whole fired to form the agglomerate of the present invention. Where it is desired to produce larger agglomerates or grains when firing in a rotary kiln, it is sometimes preferred to crush the fritted or melted product to a coarser particle size, for example, substantially all passing through a 10-mesh screen (2 mm. opening). The crushed or comminuted iron aluminate product can also be mixed with the periclase-yielding component, pressed and fired to form the agglomerate of intergrown crystals. In this mode of procedure, it is preferred to admix from about 6% to 60%, calculated as $Al_2O_3$ on the fired basis, of the alumina-yielding component and from 94% to 40%, calculated as FeO on the fired basis, of the iron oxide-yielding component. Within these preferred ratios of $Al_2O_3$ to FeO, liquids are formed at a lower temperature, promoting sintering and enabling production of grains or agglomerates of the desired larger sizes.

The intimately mixed starting materials are then heated to effect combination, crystallization or recrystallization to produce the refractory product of this invention. The mixture can be prepared in the form of a water slurry, introduced into a kiln, such as a rotary kiln, and fired; or dry mixtures can be formed into shapes, such as briquettes, nodules, pellets, or the like and fired. The mixtures are preferably fired at a temperature of from about 1600° C. to 1800° C., and improved results are obtained by firing at a temperature of at least 1700° C. but without general fusion. However, the firing procedure is a function of both time and temperature, and equivalent results can be obtained by firing at a lower temperature for a longer time and at a higher temperature for a shorter time. Alternatively, products of still lower porosity can be obtained by calcining a mixture of starting materials to an intermediate temperature, that is, to a state of incomplete reaction or incomplete recrystallization, then pressing the calcined mixture and firing the pressed means to effect reaction or crystallization. Such intermediate calcining temperatures can be, for example, 800° C. to 1200° C. for not over about an hour; although calcining at a lower temperature for a longer time or at a higher temperature for a shorter time is suitable. This calcining, pressing and firing procedure is useful in some instances to produce larger grains or denser pieces. According to this invention the mass containing the magnesia is fired without general fusion.

The following examples will demonstrate more clearly the mode of operation and the products of the present invention.

*Example 1*

Bayer process aluminum hydroxide is used as the source of alumina. The dry powder has 34% ignition loss and contains 65% $Al_2O_3$ as used. (98.8% $Al_2O_3$ on ignited basis). The iron oxide-yielding material is a technical grade powdered ferric oxide sometimes used as a ceramic coloring agent, and containing about 95% $Fe_2O_3$. These materials are intimately blended with a slurry of magnesium hydroxide containing 33% MgO and analysing 1.2% $SiO_2$, 0.3% $Fe_2O_3$, 0.2% $Al_2O_3$ and 1.3% CaO on the ignited basis. 10.9 pounds of the iron oxide and 16.7 pounds of the aluminum hydroxide are intimately mixed with 736 pounds of the magnesium hydroxide slurry. The resulting slurry is dried, briquetted, and fired to 1700° C. for about one-half hour. The resulting refractory material is hard, dense and tough, well crystallized and reddish brown in color.

The fired material is crushed into grains, and sized as follows:

|  | Parts |
|---|---|
| 6 x 14 mesh | 320 |
| 20 x 35 mesh | 160 |
| Minus 200 mesh | 224 |

With these grains are blended as bond, 80 parts of hard-burned high purity magnesia substantially all passing 325 mesh and 16 parts of magnesium sulfate (epsom salts) and 32 parts of water. The batch is pressed into shapes at about 8000 pounds per square inch (p. s. i.) and the shapes are dried to form the chemical bond. Samples of these shapes are tested for cold crushing strength after firing to various temperatures, with the following results:

| Temperature, °C | 110 | 400 | 600 | 800 | 1,000 | 1,200 |
|---|---|---|---|---|---|---|
| Crushing Stress, p. s. i. | 12,500 | 9,700 | 4,100 | 3,300 | 8,900 | 8,400 |

Another sample when tested for hot load resistance under a load of 25 p. s. i. did not shear below 1700° C. The grain product of this example is computed to contain 86.3% periclase, 5.7% magnesium aluminate, 5.1% magnesioferrite, 2.8% monticellite.

*Example 2*

25%, calculated as $Al_2O_3$, of aluminum hydroxide, 25%, calculated as $Fe_2O_3$, of pyrite sinter and 50%, calculated as MgO, of magnesium hydroxide obtained by reacting sea water with calcined dolomite, washing and filtering to recover the precipitated $Mg(OH)_2$, are mixed together, dried and fired, all of the starting materials being of particle size less than 74 microns diameter. The product has the calculated mineralogical analysis of 31.5% periclase, 28.8% magnesioferrite (MgO·Fe$_2$O$_3$), 37.1% magnesium aluminate (MgO·Al$_2$O$_3$), 1.8% monticellite and 0.8% forsterite. The grains exhibit a porosity of 8.6%. These grains are crushed and ground, and employed in the following sizes: 46.3% passing 6 mesh and retained on 14 mesh, 13.3% passing 14 mesh and retained on 20 mesh, 10.8% passing 20 and retained on 35 mesh, 23% passing 200 mesh. To these grains are added 5% hardburned magnesia (containing about 97.0% MgO), about 95% of which passes 325 mesh, and 1.6% epsom salts (magnesium sulfate), the whole tempered with water, formed into bricks under a pressure of about 10,000 p. s. i., and the bricks then dried. When heated under a loading of 25 pounds per square inch, bricks of this batch failed by shear at 1690° C. The bricks showed a spalling loss of 3.6% (about one-half the average shown by commercially available chrome spinel-magnesite bricks) and showed only a very slight volume change upon being heated in contact with iron oxide. Bricks of this composition show excellent resistance to penetration by iron oxide, during heating.

The refractory material made according to this invention can be employed as grains in preparing refractory articles, either alone or in admixture with other nonacid grain; and in suitable sizing ratios as known to the art. The product made according to this invention can also be employed as bonding material, for example, in finely divided form, in refractory batches comprising grains made according to this invention or other nonacid grains or mixtures of such grains. Other bonding materials known to the art, for example, magnesium chloride, magnesium sulfate, magnesium chromate or organic bonding materials such as lignin compounds, waste sulfite liquor, can be employed in refractory batches containing the grains of this invention.

The properties of the final refractory grain or bond material can be varied by varying the ratios of alumina to iron oxide and of magnesia to the sesquioxides, within the ranges shown above. Higher proportions of magnesia or periclase increase the refractoriness and provide a more basic refractory. Higher proportions of iron oxide provide greater volume stability in the presence of external sources of iron oxide during heating of the refractory product in use. Magnesium aluminate improves refractoriness and stability toward reducing conditions during heating in use as compared to magnesioferrite. It is particularly advantageous that the process of this invention provides a fired refractory of higher density, the presence of iron oxide promoting the early formation of magnesium aluminate; and that the process of firing to form the present product can be economically carried out in existing equipment. Materials which yield manganese oxide for reaction upon firing or calcining can be employed to replace at least a portion, or all, of the iron oxide in the mixes described above. Manganese oxide is isomorphous with iron oxide and forms similar compounds having melting points very similar to those of the corresponding iron compounds.

In conformity with common practice in reporting chemical analyses of refractory materials, in the specification and claims the proportions of the various chemical constituents present in the material are given in some instances as though these constituents were present as the simple oxide. Thus, the lime is reported as CaO; silicon, as silica, SiO$_2$; magnesium as magnesium oxide, MgO; although the silica and lime, for instance, may be present in combination with each other or with a small amount of MgO. For example, the term "1.0% CaO" is intended to mean that a chemical analysis of the material referred to would show the calcium content as 1.0%, expressed as CaO, although all of the calcium might be present as a calcium silicate or in some other combined form. The spinel analyses are calculated and expressed as simple double oxides, magnesium aluminate (MgO·Al$_2$O$_3$) and magnesioferrite (MgO·Fe$_2$O$_3$), although the oxides may be present as complex spinels or in mutual solid solutions. Furthermore, in these spinels a minor portion of the MgO can be replaced by a spinel-forming oxide of another bivalent metal such as iron, manganese, etc. as described above; and a small amount of the sesquioxides can be replaced by another spinel-forming oxide of a metal in the trivalent or tetravalent state, as disclosed above. The product consists essentially of intergrown crystals of periclase, magnesioferrite and magnesium aluminate, in the ratios described. The term "periclase" as used herein indicates magnesium oxide, MgO, crystals. In the specification and claims, percentages are expressed by weight except as to porosity or where otherwise indicated. Porosity is measured by determining the bulk density of grains of the size fraction between 6 mesh (3.36 mm. opening) and 10 mesh (2.00 mm. opening), and the true specific gravity of the same material, both expressed as grams per c. c., the difference between the specific gravity and the bulk density being divided by the specific gravity and then multiplied by 100. The mesh sizes given herein are according to United States Standard series.

Having now described the invention, what is claimed is:

1. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite and from 5% to 85% magnesium aluminate, and containing not over 2.0% CaO.

2. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite and from 5% to 85% magnesium aluminate, and containing less than 2.0% CaO and not over 5.0% SiO$_2$.

3. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite and from 5% to 85% magnesium aluminate, and containing less than 2.0% CaO, not over 5.0% SiO$_2$ and not over 1.0% boron, calculated as B$_2$O$_3$.

4. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite and from 5% to 85% magnesium aluminate, and containing less than 2.0% CaO, not over 5.0% SiO$_2$ and not over 1.0% alkali, calculated as the oxide.

5. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite and from 5% to 85% magnesium aluminate, and containing less than 2.0% CaO and not over 2.0% SiO$_2$.

6. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite and from 5% to 85% magnesium aluminate, and containing less than 2.0% CaO, not over 2.0% SiO$_2$ and not over 1.0% boron, calculated as B$_2$O$_3$.

7. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite, from 5% to 85% magnesium aluminate, and containing less than 2.0% CaO, not over 2.0% $SiO_2$ and not over 1.0% alkali, calculated as the oxide.

8. Non-fused crystalline refractory material consisting essentially of agglomerated intergrown crystals of periclase and magnesia spinels of iron oxide and alumina, in amounts calculated as from 10% to 90% periclase, from 5% to 85% magnesioferrite, from 5% to 85% magnesium aluminate, and containing less than 2.0% CaO, not over 2.0% $SiO_2$, not over 1.0% $B_2O_3$ and not over 1.0% alkali.

9. Process for making a refractory material consisting essentially of agglomerated intergrown crystals of periclase and magnesia spinels of iron oxide and alumina which comprises intimately admixing in finely divided form from 5% to 85%, calculated as magnesioferrite, of an iron oxide-providing material, from 5% to 85%, calculated as magnesium aluminate, of an alumina-providing material, and a periclase-yielding magnesium compound in amount to react with all of the iron oxide and alumina to form magnesia spinels and to provide from 10% to 90% excess periclase, and firing said admixture at from 1600° to 1800° C. for at least one-half hour to form a product containing said intergrown crystals and containing less than 2.0% CaO.

10. Process as in claim 9 wherein said iron oxide-providing material and said alumina-providing material are first admixed in amounts to provide from 94% to 40%, calculated as FeO, of said iron-oxide providing material and from 6% to 60%, calculated as $Al_2O_3$, of said alumina-providing material, said admixture is heated to cause at least partial reaction to form a product containing iron aluminate, and then said iron aluminate-containing product and said periclase-yielding material are admixed and fired.

11. Process as in claim 9 wherein said iron oxide-providing material is mill scale.

12. Process as in claim 9 wherein said periclase-yielding material is precipitated magnesium hydroxide.

13. Process as in claim 9 wherein laterite provides said iron oxide and said alumina.

14. Process as in claim 9 wherein said alumina-providing material is bauxite.

References Cited in the file of this patent

UNITED STATES PATENTS 2,492,543   Verwey ---------------- Dec. 27, 1949

UNITED STATES PATENT OFFICE
CERTIFICATE OF CORRECTION

Patent No. 2,775,527                                              December 25, 1956

Leslie W. Austin et al.

It is hereby certified that error appears in the printed specification of the above numbered patent requiring correction and that the said Letters Patent should read as corrected below.

Column 1, line 66, for "though" read -- thought --; column 4, line 11, for "recrystallization" read -- crystallization --.

Signed and sealed this 29th day of December 1959.

(SEAL)
Attest:

KARL H. AXLINE                                            ROBERT C. WATSON

Attesting Officer                                        Commissioner of Patents